(12) United States Patent
Chen et al.

(10) Patent No.: US 11,438,111 B2
(45) Date of Patent: *Sep. 6, 2022

(54) RATE MATCHING FOR COORDINATED MULTIPOINT TRANSMISSION SCHEMES

(71) Applicant: QUALCOMM Incorporated, San Diego, CA (US)

(72) Inventors: Wanshi Chen, San Diego, CA (US); Kapil Bhattad, Bangalore (IN); Peter Gaal, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,159

(22) Filed: Dec. 21, 2018

(65) Prior Publication Data

US 2020/0204310 A1 Jun. 25, 2020

Related U.S. Application Data

(63) Continuation of application No. 13/351,156, filed on Jan. 16, 2012, now Pat. No. 10,200,166.

(51) Int. Cl.
*H04L 5/00* (2006.01)
*H04L 1/00* (2006.01)
*H04B 7/024* (2017.01)

(52) U.S. Cl.
CPC .......... *H04L 5/0035* (2013.01); *H04B 7/024* (2013.01); *H04L 1/0002* (2013.01)

(58) Field of Classification Search
CPC ...... H04B 7/024; H04B 7/0486; H04L 5/0035
See application file for complete search history.

(56) References Cited

U.S. PATENT DOCUMENTS 10,200,166 B2 2/2019 Chen et al.
2007/0081448 A1 4/2007 Ahmed et al.
(Continued)

FOREIGN PATENT DOCUMENTS

EP 2296301 A1 3/2011
EP 2352328 A1 8/2011
(Continued)

OTHER PUBLICATIONS

International Search Report and Written Opinion—PCT/US2012/021567—ISA/EPO—dated May 7, 2012.
(Continued)

*Primary Examiner* — Ayaz R Sheikh
*Assistant Examiner* — Debebe A Asefa
(74) *Attorney, Agent, or Firm* — Patterson + Sheridan, L.L.P.

(57) ABSTRACT

Certain aspects of the present disclosure relate to techniques for determining resource elements REs used for Coordinated Multipoint (CoMP) transmission schemes. The techniques generally include determining, by a User Equipment (UE), a set of data REs used for Coordinated Multipoint (CoMP) operation. The determination is based on a CoMP scheme and data REs available to particular base stations involved in the CoMP operation. The technique further includes processing data received via the CoMP operation on the determined set of data REs.

26 Claims, 10 Drawing Sheets

(56) References Cited

U.S. PATENT DOCUMENTS

| | | |
|---|---|---|
| 2008/0225965 A1 | 9/2008 | Pi et al. |
| 2009/0247172 A1 | 10/2009 | Palanki et al. |
| 2009/0274037 A1 | 11/2009 | Lee et al. |
| 2010/0173637 A1 | 7/2010 | Damnjanovic et al. |
| 2010/0177746 A1 | 7/2010 | Gorokhov et al. |
| 2010/0238821 A1 | 9/2010 | Liu et al. |
| 2010/0272032 A1 | 10/2010 | Sayana et al. |
| 2011/0170625 A1 | 7/2011 | Blankenship et al. |
| 2011/0170631 A1 | 7/2011 | Kim et al. |
| 2011/0235608 A1 | 9/2011 | Koo et al. |
| 2011/0237270 A1* | 9/2011 | Noh .............. H04L 5/0035 455/450 |
| 2011/0274047 A1* | 11/2011 | Kwon ............. H04W 52/16 370/328 |
| 2012/0033643 A1* | 2/2012 | Noh .............. H04L 5/0048 370/335 |
| 2012/0039216 A1 | 2/2012 | Li et al. |
| 2012/0058791 A1 | 3/2012 | Bhattad et al. |
| 2012/0108285 A1 | 5/2012 | Yamazaki |
| 2012/0176884 A1 | 7/2012 | Zhang et al. |
| 2012/0176982 A1 | 7/2012 | Zirwas et al. |
| 2012/0182977 A1 | 7/2012 | Hooli et al. |
| 2012/0207055 A1 | 8/2012 | Kang et al. |
| 2012/0220327 A1* | 8/2012 | Lee .............. H04W 72/1273 455/509 |
| 2013/0250875 A1* | 9/2013 | Chen ............. H04W 52/365 370/329 |
| 2014/0044061 A1* | 2/2014 | Yue .............. H04J 11/0053 370/329 |
| 2020/0077372 A1* | 3/2020 | Lee .............. H04W 72/042 |

FOREIGN PATENT DOCUMENTS

| | | |
|---|---|---|
| WO | 2010057446 A1 | 5/2010 |
| WO | 2010081166 A2 | 7/2010 |
| WO | 2011106457 | 9/2011 |

OTHER PUBLICATIONS

Lee, J. et al., "MIMO Technologies in 3GPP LTE and LTE-Advanced," EURASIP Journal on Wireless Communications and Networking, vol. 2009 (2009), Article ID 302092, 10 pages, doi:10.1155/2009/302092.

LG Electronics: "CoMP Configurations and UE/eNB Behaviors in LTE-advanced", 3GPP Draft; R1-090213, 3rd Generation Partnership Project (3GPP), Mobile Competence Centre ; 650, Route Des Lucioles ; F-06921 Sophia-Anti Polis Cedex ; France, No. Ljubljana; Jan. 8, 2009, Jan. 8, 2009 (Jan. 8, 2009), XP050318143, [retrieved on Jan. 8, 2009].

Qualcomm Europe: "CoMP Cooperative Silencing Hotzone DL Performance", 3GPP Draft; R1-092052 Comp Cooperative Silencing Hotzone DL Performance, 3rd Generation Partnership Project (3GPP), Mobile Competence Centre : 650, Route Des Lucioles ; F-06921 Sophia-Antipolis Cedex: France, No. San Francisco, CA. USA; May 8, 2009, May 8, 2009 (May 8, 2009), XP002630304.

Texas Instruments: Signaling for CSI-RS and PDSCH Muting in Rel-10 LTE; Discussion and Decision, 3GPP TSG RAN WG1 #62, R1-104469, Retrieved from the internet:, Aug. 23-27, 2010, pp. 1-4.

ZTE, "Resource Mapping Issues on JP transmission in CoMP", 3GPP Draft, R1-090070 Resource Mapping Issues on JP Transmission in Comp, 3rd Generation Partnership Project (3GPP), Mobile Competence Centre , 650, Route Des Lucioles , F-06921 Sophia-Antipolis Cedex , France, No. Ljubljana, Jan. 7, 2009, Jan. 7, 2009 (Jan. 7, 2009), XP050318014.

* cited by examiner

| | | | | |
|---|---|---|---|---|
| Cell 1 Data REs | D | D | D | N |
| Cell 2 Data REs | D | N | D | D |
| Symbols to Transmit | X1 | X2 | X3 | X4 |
| Cell 1 To Transmit | X1 | X2 | X3 | 0 |
| Cell 2 To Transmit | X1 | 0 | X3 | X4 |

D = RE Available for Data

N = Punctured RE

FIG. 8

RATE MATCHING FOR COORDINATED MULTIPOINT TRANSMISSION SCHEMES

CLAIM OF PRIORITY UNDER 35 U.S.C. § 119

The present application for patent claims benefit of U.S. Provisional Patent Application Ser. No. 61/433,448, filed Jan. 17, 2011, entitled "Rate Matching for Coordinated Multipoint Transmission Schemes", and is a continuation of U.S. patent application Ser. No. 13/351,156 filed Jan. 16, 2012, entitled "Rate Matching for Coordinated Multipoint Transmission Schemes," now allowed, assigned to the assignee hereof and expressly incorporated by reference herein.

BACKGROUND

Field

Certain aspects of the present disclosure generally relate to wireless communications.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

In recent additions to wireless communication systems, under the so called LTE-Advanced feature set (e.g. 3GPP TS 36.920), different functionalities are defined for which several cells cooperate together to increase spectral efficiency, the quality and performance of the air interface. An example of such a functionality is the Coordinated Multi-Point (CoMP) that has been introduced to increase system spectral efficiency in a MIMO-like approach and is about to be fully standardized by the $3^{rd}$ Generation Partnership Project (3GPP).

SUMMARY

Certain aspects of the present disclosure provide a method for wireless communications by a user equipment. The method generally includes determining, by the UE, a set of data resource elements (REs) used for Coordinated Multipoint (CoMP) operation, wherein the determination is based on a CoMP scheme and data REs available to particular base stations involved in the CoMP operation, and processing data received via the CoMP operation on the determined set of data REs.

Certain aspects of the present disclosure provide a method for wireless communications by a first base station. The method generally includes determining a set of data resource elements (REs) used by particular base stations, including the first base station, for Coordinated Multipoint (CoMP) operation to a user equipment (UE), and transmitting data via the CoMP operation on the determined set of data REs to the UE.

Certain aspects of the present disclosure provide an apparatus for wireless communications. The apparatus generally includes means for determining, by the apparatus, a set of data resource elements (REs) used for Coordinated Multipoint (CoMP) operation, wherein the means for determining determine based on a CoMP scheme and data REs available to particular base stations involved in the CoMP operation, and means for processing data received via the CoMP operation on the determined set of data REs.

Certain aspects of the present disclosure provide an apparatus for wireless communications. The apparatus generally includes means for determining a set of data resource elements (REs) used by particular base stations, including a first base station, for Coordinated Multipoint (CoMP) operation to a user equipment (UE), and means for transmitting data via the CoMP operation on the determined set of data REs to the UE.

Certain aspects of the present disclosure provide an apparatus for wireless communications. The apparatus generally includes a processing system configured to determine, by the apparatus, a set of data resource elements (REs) used for Coordinated Multipoint (CoMP) operation, wherein the determination is based on a CoMP scheme and data REs available to particular base stations involved in the CoMP operation, and process data received via the CoMP operation on the determined set of data REs.

Certain aspects of the present disclosure provide an apparatus for wireless communications. The apparatus generally includes a processing system and a transmitter. The processing system is configured to determine a set of data resource elements (REs) used by particular base stations for Coordinated Multipoint (CoMP) operation to a user equipment (UE). The transmitter configured to transmit data via the CoMP operation on the determined set of data REs to the UE.

Certain aspects of the present disclosure provide a computer-program product for wireless communications. The computer-program product generally includes a computer-readable medium having code for determining, by a UE, a set of data resource elements (REs) used for Coordinated Multipoint (CoMP) operation, wherein the determination is based on a CoMP scheme and data REs available to particular base stations involved in the CoMP operation, and processing data received via the CoMP operation on the determined set of data REs.

Certain aspects of the present disclosure provide a computer-program product for wireless communications. The computer-program product generally includes a computer-readable medium having code for determining a set of data resource elements (REs) used by particular base stations for Coordinated Multipoint (CoMP) operation to a user equipment (UE), and transmitting data via the CoMP operation on the determined set of data REs to the UE.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 illustrates an example determination of data REs for use by base station in a CoMP system, in accordance with aspects of the present disclosure.

DETAILED DESCRIPTION

Figure 1:
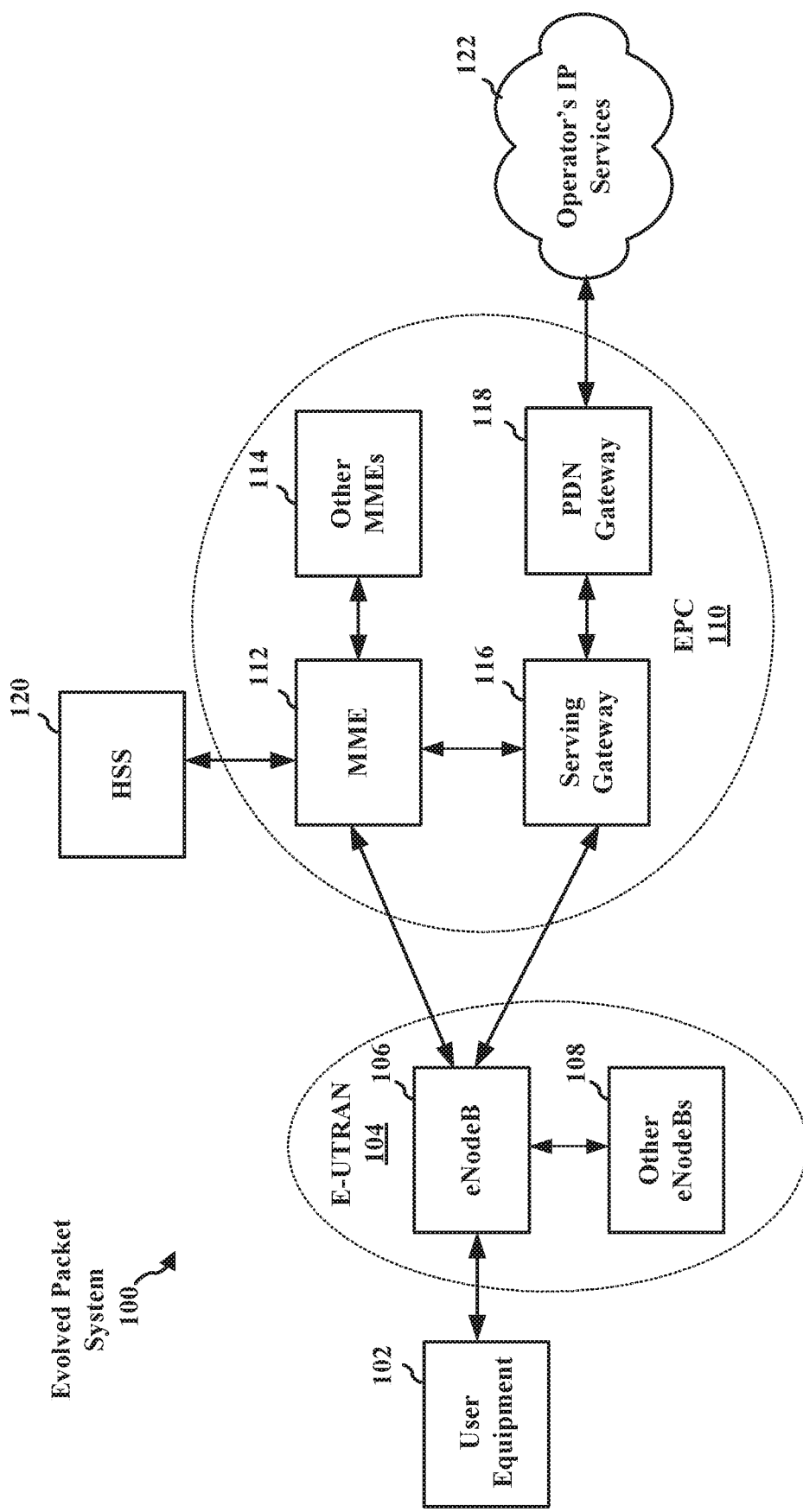
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating a LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
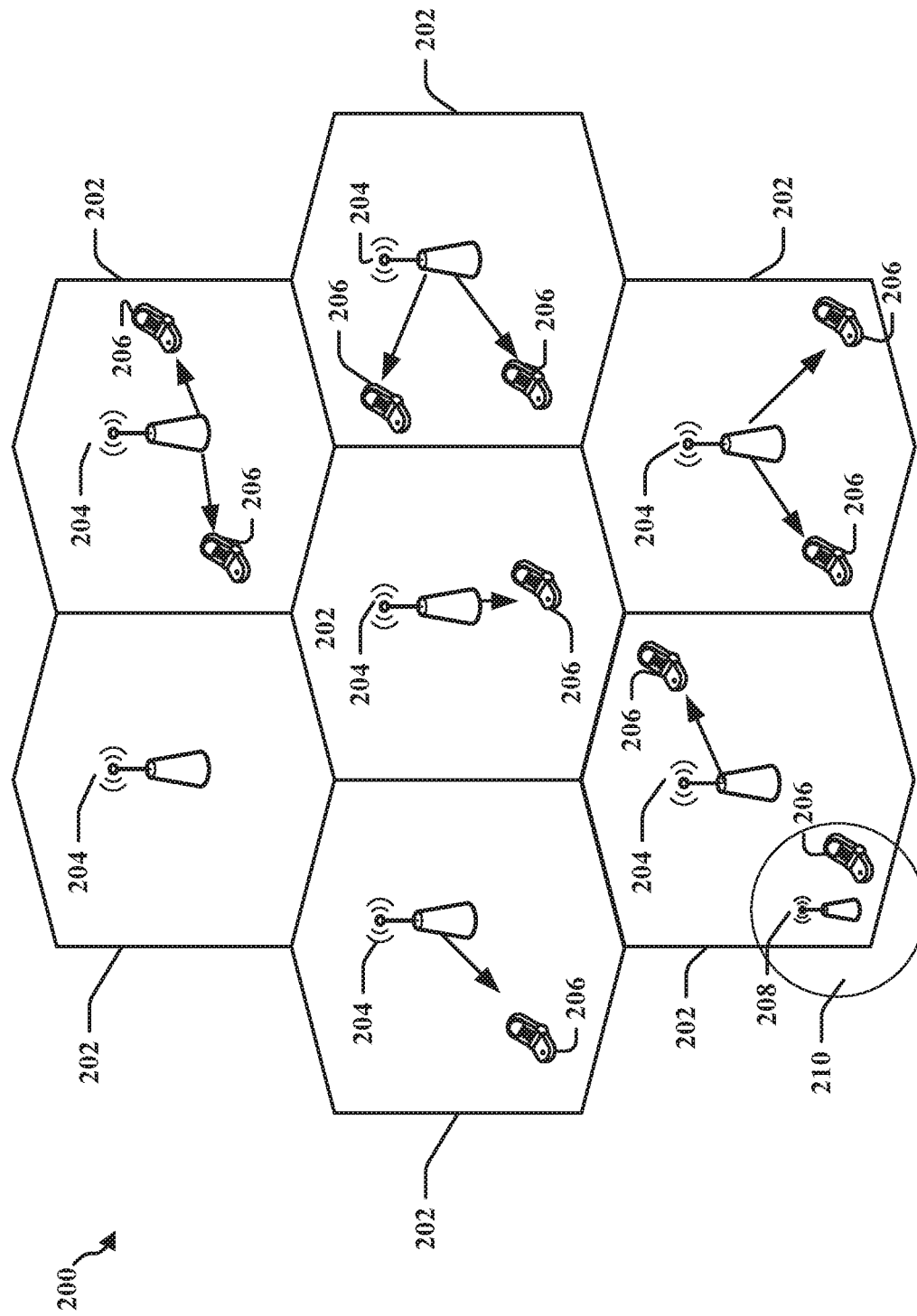
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
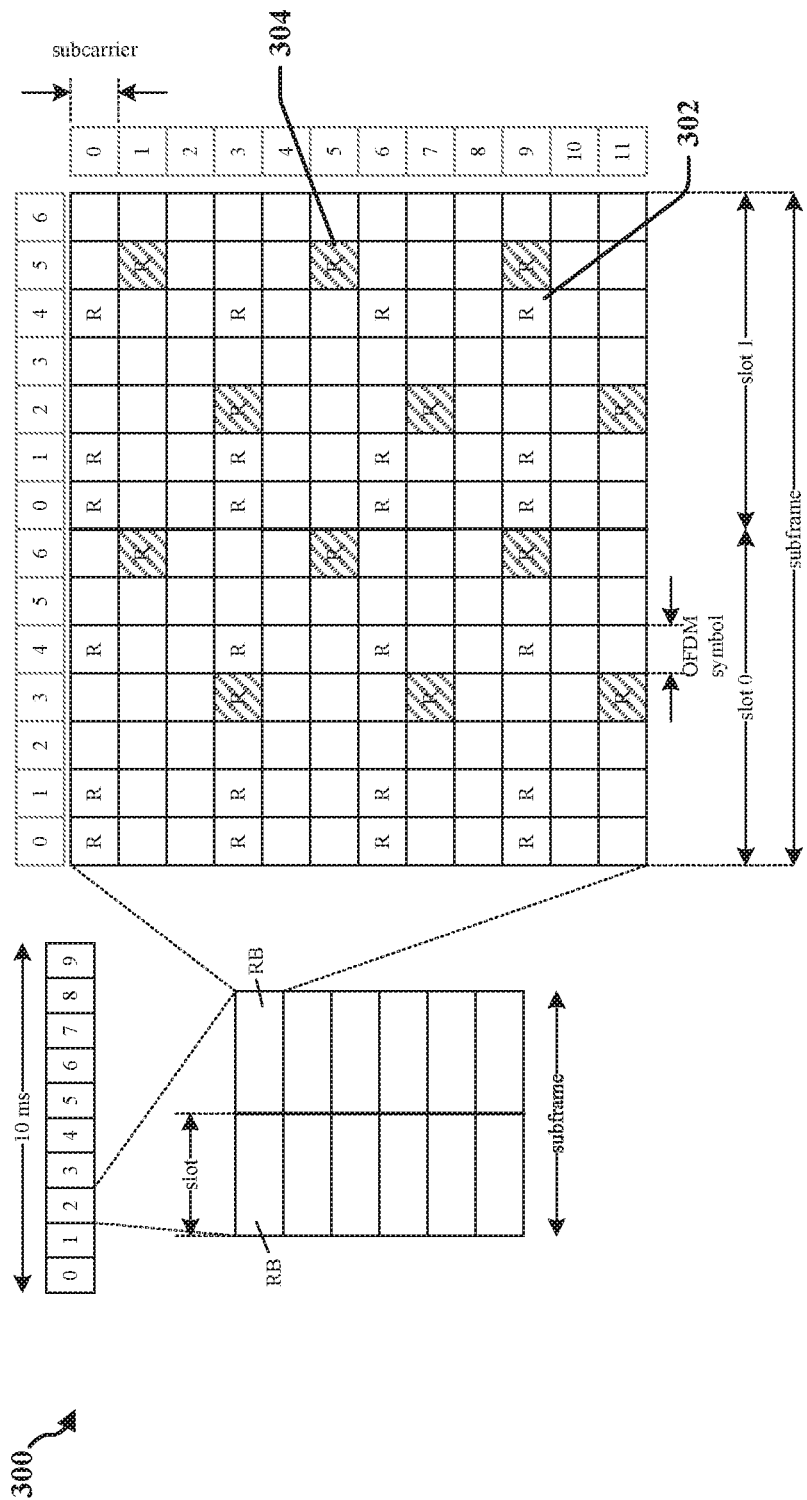
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
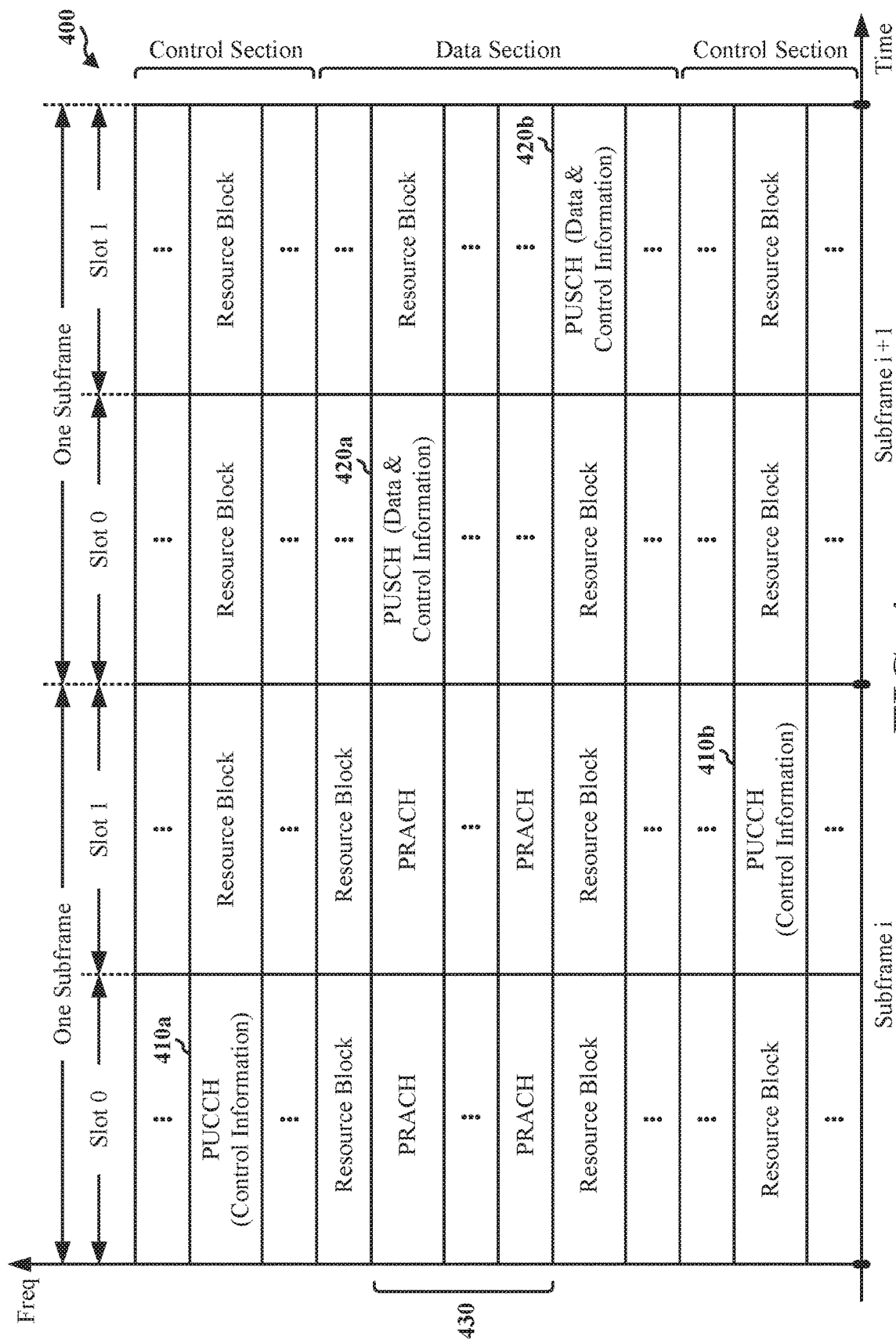
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
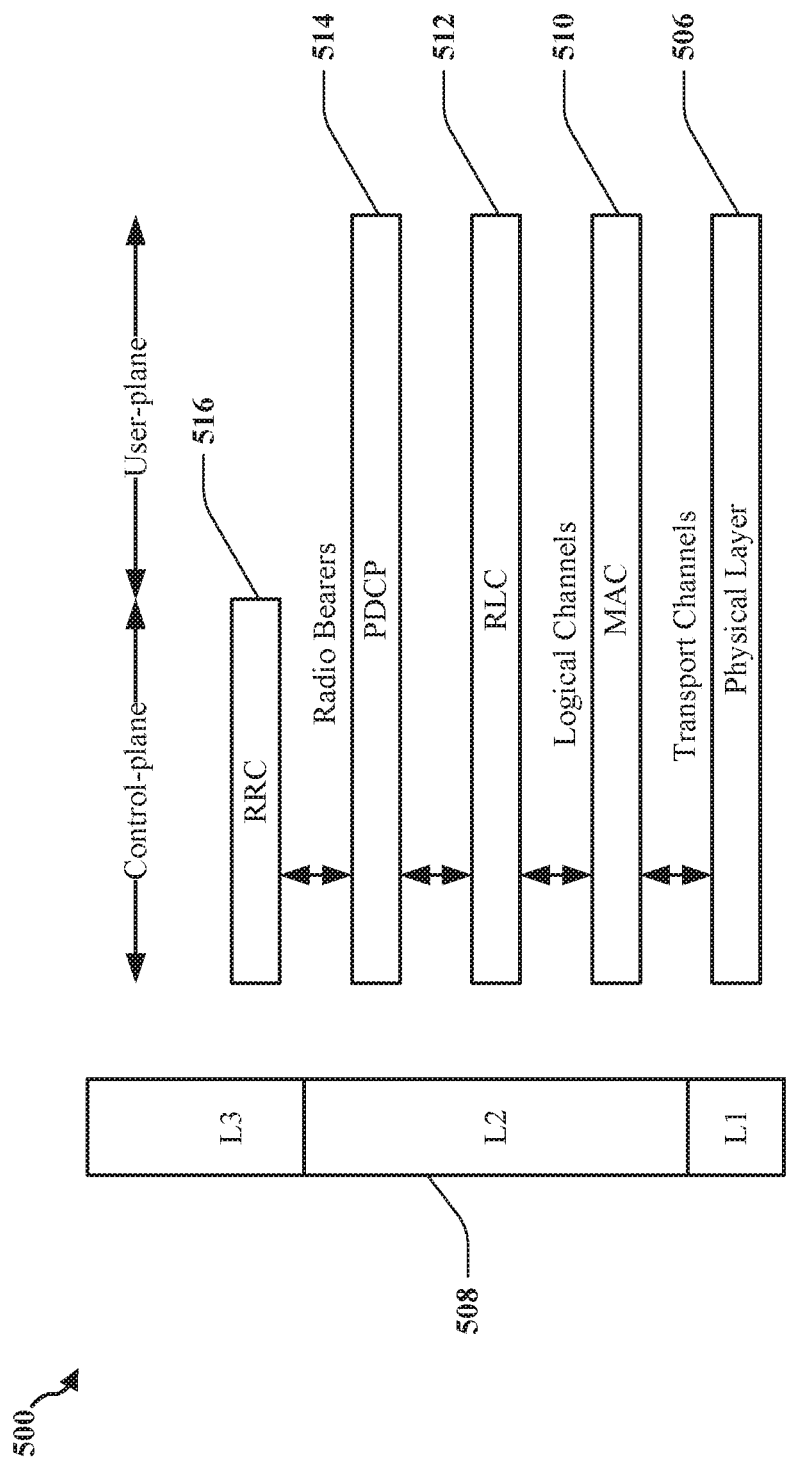
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

FIG. 3 is a diagram 300 illustrating an example of a DL frame structure in LTE. A frame (10 ms) may be divided into 10 equally sized sub-frames. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
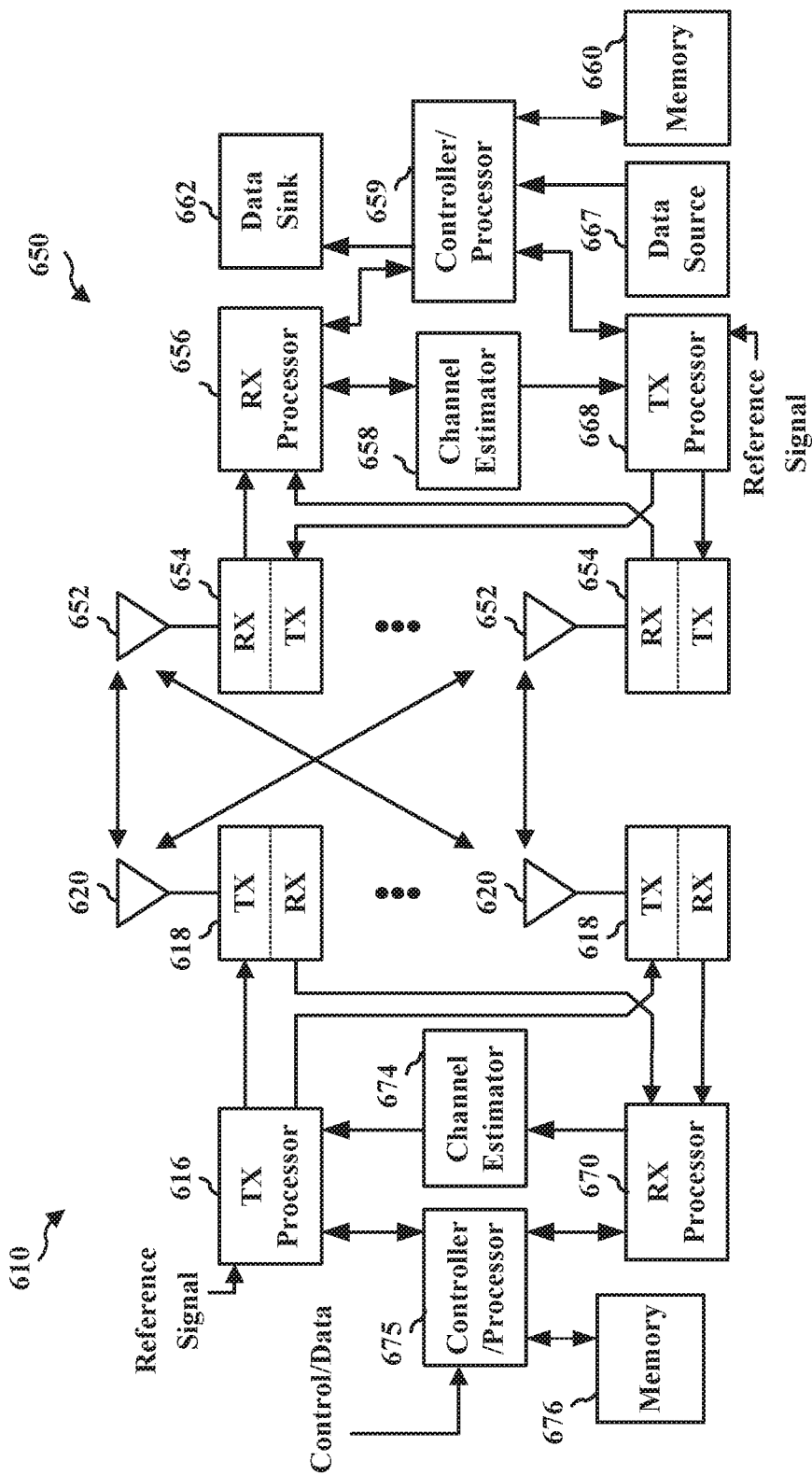
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656.

The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Rate Matching for Coordinated Multipoint Transmission Schemes

As noted above, in recent additions to wireless communication systems, such as the so called LTE-Advanced feature set (e.g. 3GPP TS 36.920), different functionalities are defined for which several cells cooperate together to increase spectral efficiency, the quality and performance of the air interface. An example of such a functionality is Coordinated Multi-Point (CoMP) operation that has been introduced to increase system spectral efficiency in a MIMO-like approach (where different base stations involved in a CoMP operation may be considered analogous to a separate MIMO Tx antenna) and is about to be fully standardized by the $3^{rd}$ Generation Partnership Project (3GPP).

Figure 7:
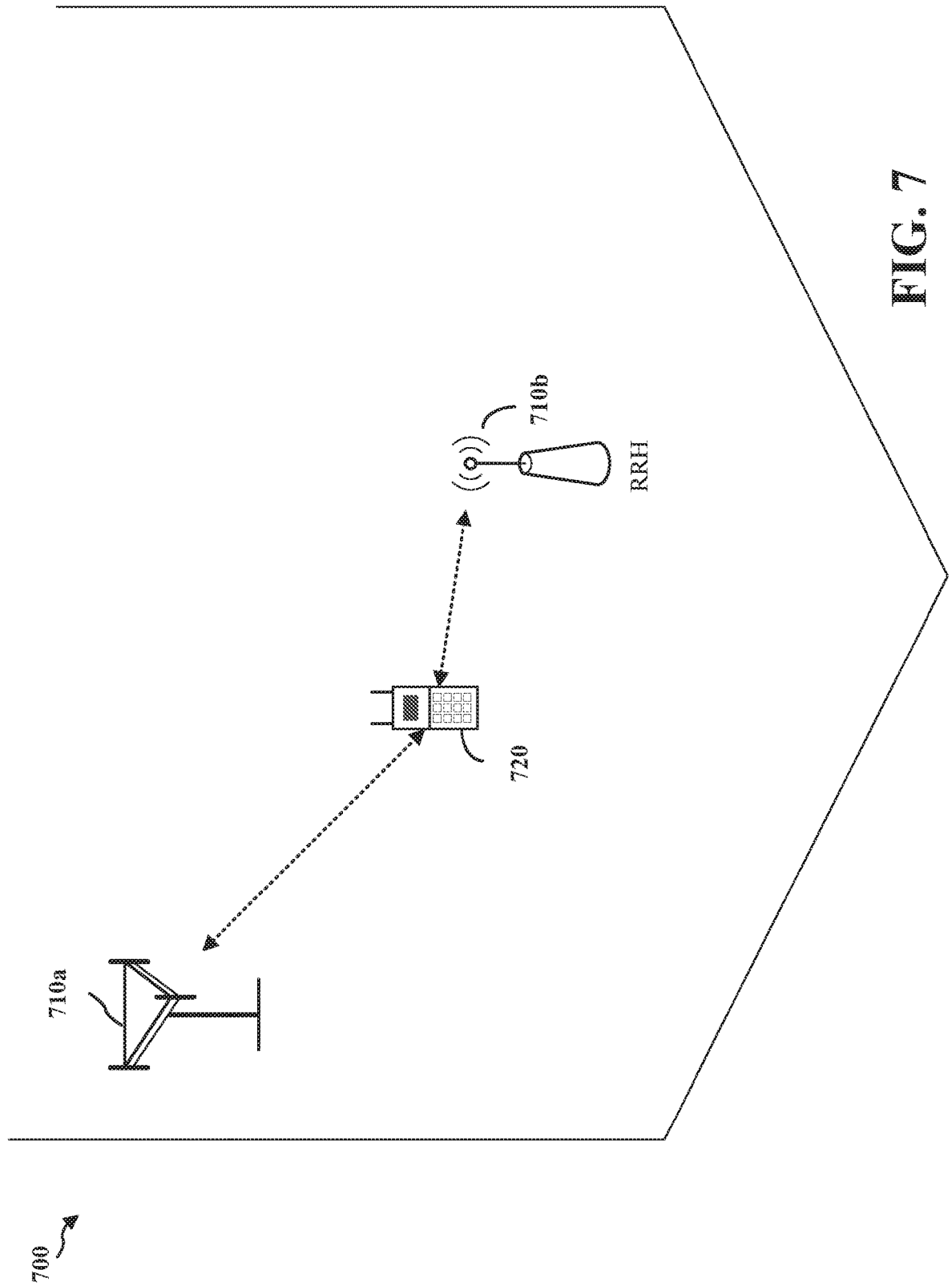
FIG. 7 illustrates an example CoMP system.

FIG. 7 illustrates an example system, in which a plurality of base stations 710 (e.g., a serving eNB 710a and a remote radio head RRH 710b) may coordinate transmissions to one or more UEs 720 using one or more CoMP schemes. Base stations 710 and UEs 720 may be configured to participate in CoMP schemes, taking advantage of techniques, described in greater detail below, to account for different base stations utilizing different data REs (different numbers and/or locations of data REs).

As used herein, the term CoMP scheme generally refers to a particular scheme used by multiple base stations to coordinate transmissions to one or more UEs. Some examples of CoMP schemes include joint transmission, Distributed MIMO, coordinated beamforming, dynamic point switching, and the like.

In a joint transmission CoMP scheme, multiple base stations (or eNBs) typically transmit the same data meant for a UE. For example, the coordinating base stations may utilize a joint precoding vector that spans all of the antennas of all the involved base stations.

In a Distributed MIMO CoMP scheme, multiple base stations typically transmit different pieces of data meant for a UE as different MIMO layers. For example, one layer may be sent by one base station, a second layer sent by a second base station, and so on, up to the number of supported layers.

In a Coordinated beamforming CoMP scheme, each particular base station transmits to its UE (that it serves) using beams that are chosen to reduce interference to UEs served by participating CoMP base stations in other neighboring cells.

In a dynamic point switching CoMP scheme, the serving base station for a UE may change over time within a set of base stations.

One issue with CoMP schemes arises because the particular REs used for data by the different CoMP base stations are different. The exact number and location of data REs used by different base stations may be different for one or more various reasons. For example, different base stations may have different numbers of control symbols, leaving different numbers of REs available for data. As other examples, the location of CRS may be different, their CSI-RS patterns may be different, and/or their patterns of muted REs may be different. As used herein, the term muted RE generally refers to REs on which a base station limits transmission, for example, to reduce interference with other base stations or to facilitate interference measurement for other base stations As an example of such limited transmission, some REs may be transmitted with zero power.

The failure of scheduling and mapping algorithms of CoMP base stations to take into account the fact that different base stations may transmit on different data REs may result in different modulation symbols being transmitted on the same REs. The resulting conflict may lead to reduced performance, with potentially significant offset to the intended gains achievable by using CoMP.

One approach to account for different data REs used by different CoMP base stations is to use CoMP schemes on only a limited type of subframes in which the issues discussed above are mitigated. For example, CoMP schemes may be limited to MBSFN subframes where CRS are not present in the data region. Unfortunately, differences in muting and CSI-RS patterns may still cause a mismatch in the location of available data REs even on MBSFN subframes.

Certain aspects of the present disclosure, however, provide techniques that may help address issues created with different available data REs across different eNBs, across various subframe types.

According to certain aspects, CoMP participating base stations may ensure that modulation symbols transmitted on data REs that are used by all of the participating base stations are the same. UEs involved in the CoMP operation may determine which data REs are used by all participating base stations and process the modulation symbols transmitted thereon, with some assurance there is no conflict.

According to certain aspects, only REs that are data REs across all eNBs involved in the CoMP operation may be used. This approach may be particularly suitable for Joint transmission (with each eNB transmitting the same symbols on the same common data REs).

According to certain aspects, the determination of REs available for data transmission in the CoMP operation is based on signaling that provides a starting symbol index of data REs. In such cases, the UE may be signaled, via a semi-static configuration or via a dynamic indication using a physical downlink control channel (PDCCH), the starting symbol for the data channel.

In LTE, up to three symbols can be used for control for large system bandwidths. The number of control symbols can be differently managed in each of the base stations involved in the CoMP operation. The number of control symbols for a base station may also change on a per subframe basis. A UE can typically rely on decoding of a physical format indication channel (PCFICH), possibly combining with a physical H-ARQ indicator channel (PHICH), to determine the number of control symbols used by a cell in a subframe. The starting symbol of data channels is typically the one right after the control region.

A UE with two or more base stations involved in the CoMP operation can be explicitly indicated a starting symbol index for data transmissions without the need to decode PCFICH and/or PHICH from two or more base stations. The starting symbol index can be separately indicated for each of the particular base stations involved in the CoMP operation. This provides flexibility and efficiency in the CoMP operation. A UE can be explicitly or implicitly signaled to use one of the starting symbol indices for data reception in a subframe corresponding to a particular base station for the CoMP operation. As an example, the particular base station can be linked to the base station in which the PDCCH is transmitted. Alternatively, a single starting symbol index may be indicated for all of the particular base stations involved in the CoMP operation.

According to certain aspects, the determination of data REs for the CoMP operation is based on the available data REs for a cell in which the corresponding physical downlink control channel (PDCCH) is transmitted. The available data REs for the cell carrying the PDCCH can be determined by the UE the same way as when the UE is not configured with the CoMP operation. As an example, the UE can decode PCFICH and/or PHICH to figure out the control region and hence the starting symbol index of the data region. In addition, based on information of the RS configuration (CRS, CSI-RS, and UE-RS), and possibly other channels (e.g., primary broadcast channel, primary synchronization channel, secondary synchronization channel, etc), the UE can determine the set of REs available for data transmissions.

According to certain aspects, each eNB may use its data REs. This approach may be suitable for coordinated BF, distributed MIMO, dynamic point switching, etc., where there is only a single eNB transmitting to the UE at a time. However, this approach may present challenges with regard to Joint Transmissions. For example, if such a scheme is used for joint transmission, the base stations may need to ensure that the modulation symbols they transmit on data REs that are also data REs for other eNBs are the same.

For example, multiple base stations may rate match assuming a subset of common data REs (e.g., a union or intersection) of the data REs and punctured data locations not available to them. For example, in case of punctured data locations, a base station may transmit different symbols on REs corresponding to punctured data location than those transmitted from the other base stations. For example, FIG. 8 illustrates an example of two base stations (for Cell 1 and Cell 2) with data REs {D,D,D,N} and {D,N,D,D} meaning the fourth location corresponds to an RE for puncture data for Cell 1 and the second location corresponds to an RE for puncture data for Cell 2. The base stations may identify modulation symbols {X1,X2,X3,X4} to transmit with the 1st base stations transmitting {X1,X2,X3,0} and the 2nd base station transmitting {X1,0,X3,X4}. For demodulating such a scheme, independent channel estimates may be needed from the different eNBs, which may be done, if needed, with different UE-RS layers.

Figure 9:
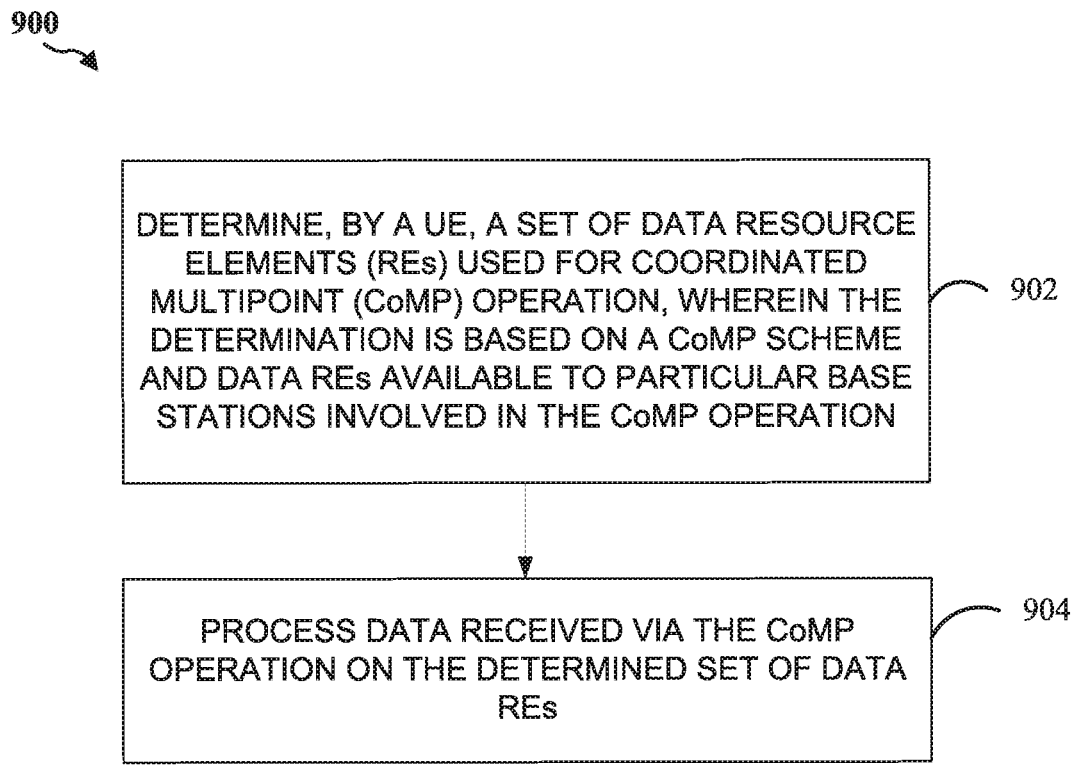
FIG. 9 illustrates example operations 900 that may be performed by a user equipment (UE) to process CoMP transmissions, in accordance with certain aspects of the present disclosure.

FIG. 9 illustrates example operations 900 that may be performed by a UE to process CoMP transmissions, in accordance with certain aspects of the present disclosure. The operations may be performed, for example, by the UE 720 shown in FIG. 7 (e.g., utilizing corresponding processors and components shown in FIG. 6).

The operations 900 begin, at 902, by determining, by the UE, a set of data resource elements (REs) used for Coordinated Multipoint (CoMP) operation, wherein the determination is based on a CoMP scheme and data REs available to particular base stations involved in the CoMP operation. At 904, the UE processes data received via the CoMP operation on the determined set of data REs.

Figure 10:
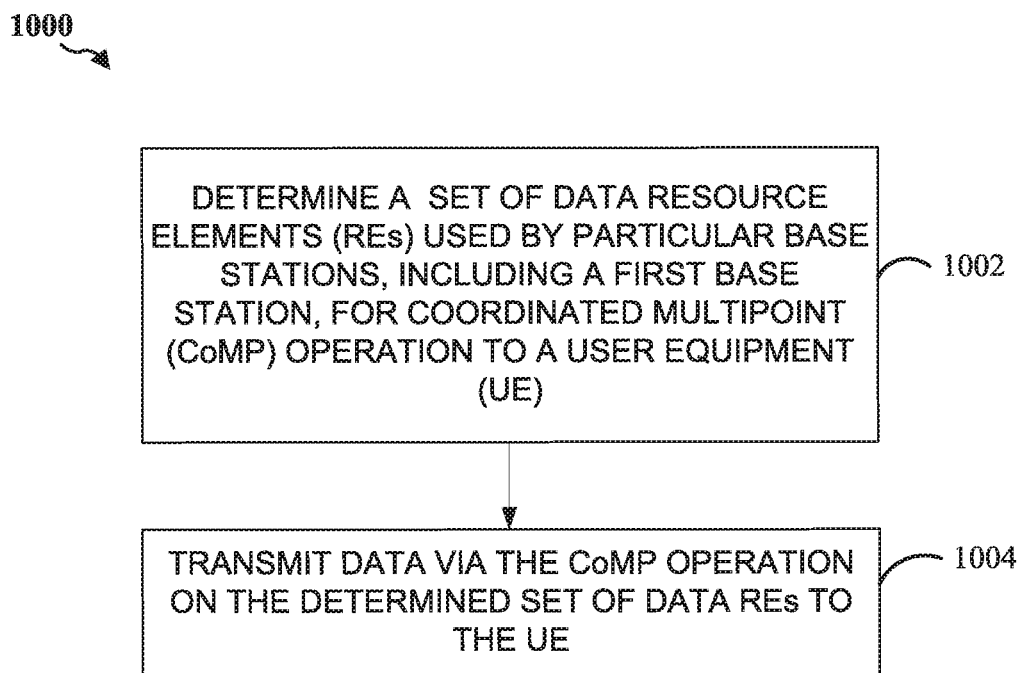
FIG. 10 illustrates example operations 1000 that may be performed by a base station to process CoMP transmissions, in accordance with certain aspects of the present disclosure.

FIG. 10 illustrates example operations 1000 that may be performed by a base station to process CoMP transmissions, in accordance with certain aspects of the present disclosure. The operations may be performed, for example, by one of the base stations 710 shown in FIG. 7 (e.g., utilizing corresponding processors and components shown in FIG. 6).

The operations 1000 begin, at 1002, by determining a set of data resource elements (REs) used by particular base stations, including the base station, for Coordinated Multipoint (CoMP) operation to a user equipment (UE). At 1004, the first station transmits data via the CoMP operation on the determined set of data REs to the UE.

In some cases, different solutions for determining data REs may be picked for different CoMP schemes. According to certain aspects, a UE may figure out which REs are data REs based on the particular CoMP scheme and the particular base stations involved in the CoMP operation. Such knowledge may be signaled, for example, through semi-static configuration or dynamic indication. For semi-static configuration, higher layer signaling may indicate the involved nodes and relevant CoMP scheme to a UE. For dynamic indication, such knowledge may be conveyed in a PDCCH.

For such a solution to work effectively, a UE involved in the CoMP operation may need to be aware of at least one of muting configuration and CSI-RS configuration (periodicity, subframe offset, intra subframe location) of neighboring cells involved in the CoMP operation in addition to its own. The CSI-RS configuration may, for example, indicate REs used for transmitting CSI-RS by the base stations involved in the CoMP operation. For example, the muting configuration may indicate REs in which the base station(s) involved in the CoMP operation limit transmission.

In certain cases, CSI-RS and/or muting may be dropped on certain subframes due to collisions with paging. In this case, data REs that were previously allocated for CSI-RS/ muting may become available for data transmission. Various approaches may be taken to address this scenario. As an example, a first approach may simply not treat such REs as data REs. In a second approach, however, a UE may treat these REs as available data REs for that particular base station. In this case, for these data REs to be treated as available data REs, UEs and eNBs affected by it may have to be made to become aware of (e.g., by detecting) when the CSI-RS/muting is dropped (e.g., through signaling).

The techniques presented herein may allow for efficient use of data REs in CoMP operations. The techniques presented herein may be applied in CoMP networks utilizing base stations of the same power class (homogenous networks) or CoMP networks utilizing base stations of different power classes (e.g., heterogeneous networks), as well as networks utilizing Relays and remote radio heads (RRHs).

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in Figures, those operations may have corresponding counterpart means-plus-function components capable of performing such operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a first base station, comprising:
    determining a set of data resource elements (REs) used by particular base stations, including the first base station, for Coordinated Multipoint (CoMP) operation to a user equipment (UE), wherein the determining is based on a union of data REs used by each of the particular base stations involved in the CoMP operation;
    transmitting data via the CoMP operation on the determined set of data REs to the UE; and
    ensuring, based at least in part on a starting symbol index of the determined set of data REs, that modulation symbols transmitted by the first base station to the UE on the determined set of data REs are the same as for other base stations, wherein the particular base stations, including the first base station, involved in the CoMP operation explicitly signal the starting symbol index of data REs to the UE.

2. The method of claim 1, wherein the ensuring comprises:
    transmitting the same modulation symbols, as those transmitted by each of the other particular base stations involved in the CoMP operation, on a subset of the union of data REs.

3. The method of claim 2, wherein:
    the determination is further based on REs corresponding to punctured data locations not available to some of the particular base stations involved in the CoMP operation; and
    the first base station transmits different modulation symbols on REs corresponding to punctured data locations than those transmitted from the other base stations.

4. The method of claim 1, wherein the determination is based on an intersection of data REs used by the particular base stations, including the first base station, involved in the CoMP operation.

5. The method of claim 1, wherein the signaling is provided via a semi-static configuration.

6. The method of claim 1, wherein the signaling is provided via a dynamic indication conveyed using a physical downlink control channel (PDCCH).

7. The method of claim 1, wherein the starting symbol index is separately indicated by the first base station from the starting symbol index indicated by another base station of the particular base stations involved in the CoMP operation.

8. The method of claim 1, wherein a single starting symbol index is indicated for all of the particular base stations, including the first base station, involved in the CoMP operation.

9. The method of claim 1, wherein the determination is based on available data REs for a cell in which a corresponding physical downlink control channel (PDCCH) is transmitted.

10. The method of claim 1, wherein the determination is based on at least one of:
   a channel state information reference signal (CSI-RS) configuration indicating REs used for transmitting CSI-RS by the particular base stations involved in the CoMP operation; and
   a muting configuration indicating REs in which the particular base stations involved in a CoMP operation limit transmission.

11. The method of claim 10, wherein:
   at least one of CSI-RS and muting is dropped on certain subframes; and
   the determination comprises determining that one or more data REs previously allocated for at least one of CSI-RS or muting become available for data transmission on those certain subframes.

12. The method of claim 1, further comprising:
   providing signaling, to the UE, of an indication of a CoMP scheme used for the CoMP operation and the particular base stations involved in the CoMP operation.

13. The method of claim 1, wherein the particular base stations involved in the CoMP operation comprise base stations of different power classes in a heterogeneous network.

14. The method of claim 1, wherein modulation symbols are transmitted from each of the particular base stations involved in the CoMP operation.

15. The method of claim 1, wherein modulation symbols are transmitted from a subset of the particular base stations involved in the CoMP operation.

16. An apparatus for wireless communications, comprising:
   means for determining a set of data resource elements (REs) used by particular base stations, including a first base station, for Coordinated Multipoint (CoMP) operation to a user equipment (UE) wherein the means for determining determine based on a union of data REs used by each of the particular base stations involved in the CoMP operation;
   means for transmitting data via the CoMP operation on the determined set of data REs to the UE; and
   means for ensuring, based on a starting symbol index of the determined set of data REs that modulation symbols transmitted by the first base station to the UE on the determined set of data REs are the same as for other base stations, wherein the particular base stations, including the first base station, involved in the CoMP operation explicitly signal the starting symbol index of data REs to the UE.

17. The apparatus of claim 16, wherein the means for ensuring ensure by transmitting the same modulation symbols, as those transmitted by each of the other particular base stations involved in the CoMP operation, on a subset of the union of data REs.

18. The apparatus of claim 17, wherein:
   the means for determining further determine based on REs corresponding to punctured data locations not available to some of the particular base stations involved in the CoMP operation; and
   the first base station transmits different modulation symbols on REs corresponding to punctured data locations than those transmitted from the other base stations.

19. The apparatus of claim 16, wherein the means for determining determine based on an intersection of data REs used by the particular base stations, including the first base station, involved in the CoMP operation.

20. The apparatus of claim 16, wherein the signaling is provided via a semi-static configuration.

21. The apparatus of claim 16, wherein the signaling is provided via a dynamic indication conveyed using a physical downlink control channel (PDCCH).

22. The apparatus of claim 16, wherein the starting symbol index is separately indicated by the first base station from the starting symbol index indicated by another base station of the particular base stations involved in the CoMP operation.

23. The apparatus of claim 16, wherein the means for determining determine based on available data REs for a cell in which a corresponding physical downlink control channel (PDCCH) is transmitted.

24. The apparatus of claim 16, wherein the means for determining determine based on at least one of:
   a channel state information reference signal (CSI-RS) configuration indicating REs used for transmitting CSI-RS by the particular base stations involved in the CoMP operation; and
   a muting configuration indicating REs in which the particular base stations involved in a CoMP operation limit transmission.

25. The apparatus of claim 24, wherein:
   at least one of CSI-RS and muting is dropped on certain subframes, and
   the means for determining determine that one or more data REs previously allocated for at least one of CSI-RS or muting become available for data transmission on those certain subframes.

26. The apparatus of claim 16, further comprising:
   means for signaling, to the UE, of an indication of a CoMP scheme used for the CoMP operation and the particular base stations involved in the CoMP operation.

* * * * *